(12) United States Patent
Huang (10) Patent No.: US 8,833,933 B1
(45) Date of Patent: Sep. 16, 2014

(54) EYEGLASSES AND FOLDABLE STRUCTURE THEREOF

(71) Applicant: Rusan Optical Industrial Co., Ltd., Taipei (TW)

(72) Inventor: Chin-Shui Huang, Taipei (TW)

(73) Assignee: Rusan Optical Industrial Co., Ltd., Taipei (TW)

( * ) Notice: Subject to any disclaimer, the term of this patent is extended or adjusted under 35 U.S.C. 154(b) by 11 days.

(21) Appl. No.: 13/898,638

(22) Filed: May 21, 2013

(51) Int. Cl.
*G02C 5/08* (2006.01)
*G02C 5/20* (2006.01)
*G02C 5/00* (2006.01)

(52) U.S. Cl.
CPC ...... *G02C 5/006* (2013.01); *G02C 5/20* (2013.01); *G02C 5/08* (2013.01)
USPC .................................................. 351/63; 2/454

(58) Field of Classification Search
USPC .......................................... 351/63, 41; 2/454
See application file for complete search history.

(56) References Cited

U.S. PATENT DOCUMENTS

| | | | | |
|---|---|---|---|---|
| 2,537,248 A | * | 1/1951 | Vigano | 351/63 |
| 3,395,964 A | * | 8/1968 | Nieder | 351/63 |
| 6,409,335 B1 | * | 6/2002 | Lipawsky | 351/63 |
| 6,513,926 B1 | * | 2/2003 | Kizu | 351/63 |
| 7,455,402 B2 | * | 11/2008 | Gerber et al. | 351/63 |

* cited by examiner

*Primary Examiner* — Hung Dang
(74) *Attorney, Agent, or Firm* — Chun-Ming Shih; HDLS IPR Services (57) ABSTRACT

A pair of eyeglasses includes a foldable structure and a pair of lens assemblies aligned with each other in a row. The foldable structure includes a first body member having a receiving chamber; a second body member aligned with the first body member and configured to rotate relative thereto; the first and second body members being secured onto adjacent sides of the pair of lens assemblies; one end of a bendable linear member including a stopping portion received within the receiving chamber and another end thereof penetrating through the second body member and attached thereto; and an elastic unit mounted onto the bendable linear member and clamped axially and elastically between inner wall of the receiving chamber and the stopping portion. Accordingly, the eyeglasses can be advantageously folded with a significantly reduced size for facilitated portability and storage.

23 Claims, 9 Drawing Sheets

EYEGLASSES AND FOLDABLE STRUCTURE THEREOF

BACKGROUND OF THE INVENTION

1. Field of the Invention

The present invention relates to a foldable structure, in particular, to a pair of eyeglasses and a foldable structure thereof.

2. Description of Related Art

Currently, there are different types of eyeglasses including such as myopic glasses, presbyopia glasses and sunglasses, which mainly comprise a pair of lens assemblies, a pair of temples and a bridge member; wherein the bridge member is attached between two adjacent sides of the pair of lens assemblies, the two temples are pivotally attached to a distant sides of the two lens assemblies respectively. Furthermore, the lens assemblies are constructed mainly by a lens frame and a lens attached to the lens frame.

To facilitate storages, the aforementioned eyeglasses mostly adapt the design of using a hinge-type bridge member such that the two lens assemblies can be folded up along the center of the bridge member therebetween in order to allow the pair of eyeglasses to be stored in a box or container entirely.

However, since the lenses are of curved profiles for all types of eyeglasses, there is an excess space created between the two curved lenses once the lens assemblies are folded up and opposed to each other, which causes the overall sizes of the eyeglasses after folding to be relatively large. There is a need for an improvement to overcome such drawback.

SUMMARY OF THE INVENTION

An objective of the present invention is to provide a pair of eyeglasses and a foldable structure thereof capable of using the foldable structure to allow the two lens assemblies to be elastically pulled apart from each other for relative rotations such that the outer side of the right lens can be stacked onto the inner side of the left lens in order to prevent the creation of any excess space of known arts and such that the overall size of eyeglasses after folding can be significantly reduced for storages and the effect of advantageous folding thereof can be achieved.

To achieve the aforementioned objective, the present invention provides a foldable structure of a pair of eyeglasses, comprising: a first body member comprising a receiving chamber; a second body member aligned with the first body in a row and configured to rotate relatively thereto; a bendable linear member comprising a stopping portion on one end thereof; the stopping portion received within the receiving chamber; another end of the bendable linear member penetrated the second body member and attached thereto; and an elastic unit mounted on the bendable linear member and clamped axially and elastically between an inner wall of the receiving chamber and the stopping portion.

The present invention further provides a pair of eyeglasses, comprising: a pair of lens assemblies aligned with each other in a row; and a foldable structure comprising: a first body member comprising a receiving chamber; a second body member aligned with the first body in a row and configured to rotate relatively thereto; a bendable linear member comprising a stopping portion on one end thereof; the stopping portion received within the receiving chamber; another end of the bendable linear member penetrated the second body member and attached thereto; and an elastic unit mounted on the bendable linear member and clamped axially and elastically between an inner wall of the receiving chamber and the stopping portion.

In comparison to the known arts, the present invention is of the following technical effects and merits of: capable of being advantageously folded up to significantly reduce the overall size after folding and being configured for facilitated portability and storage.

DETAILED DESCRIPTION OF THE INVENTION

The following provides detailed description of embodiments of the present invention along with the accompanied drawings. It can, however, be understood that the accompanied drawings are provided for illustrative purposes only and shall not be treated as limitations to the present invention.

Figure 1:
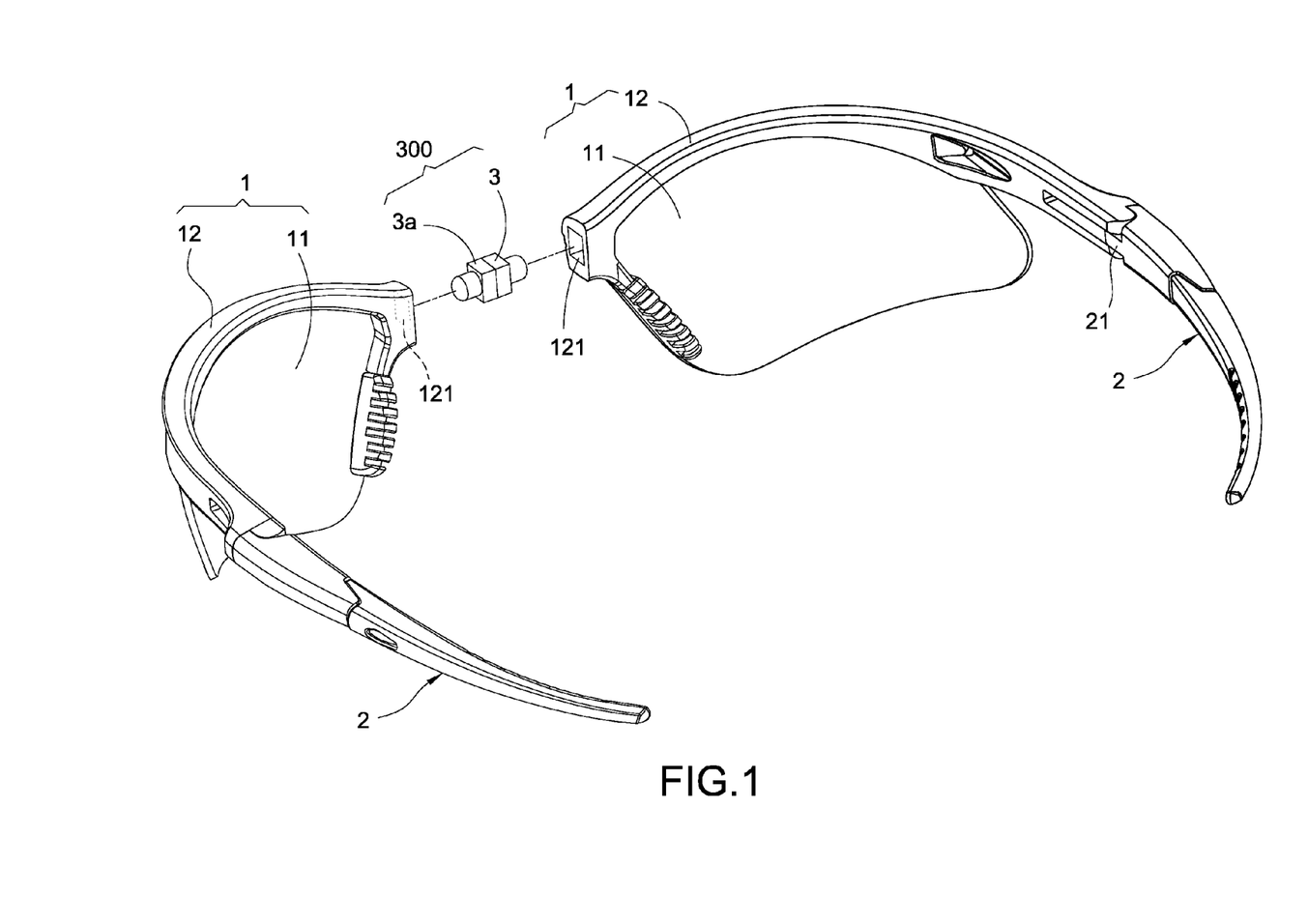
FIG. 1 is an exploded view of a preferred embodiment of a pair of eyeglasses of the present invention.
Figure 10:
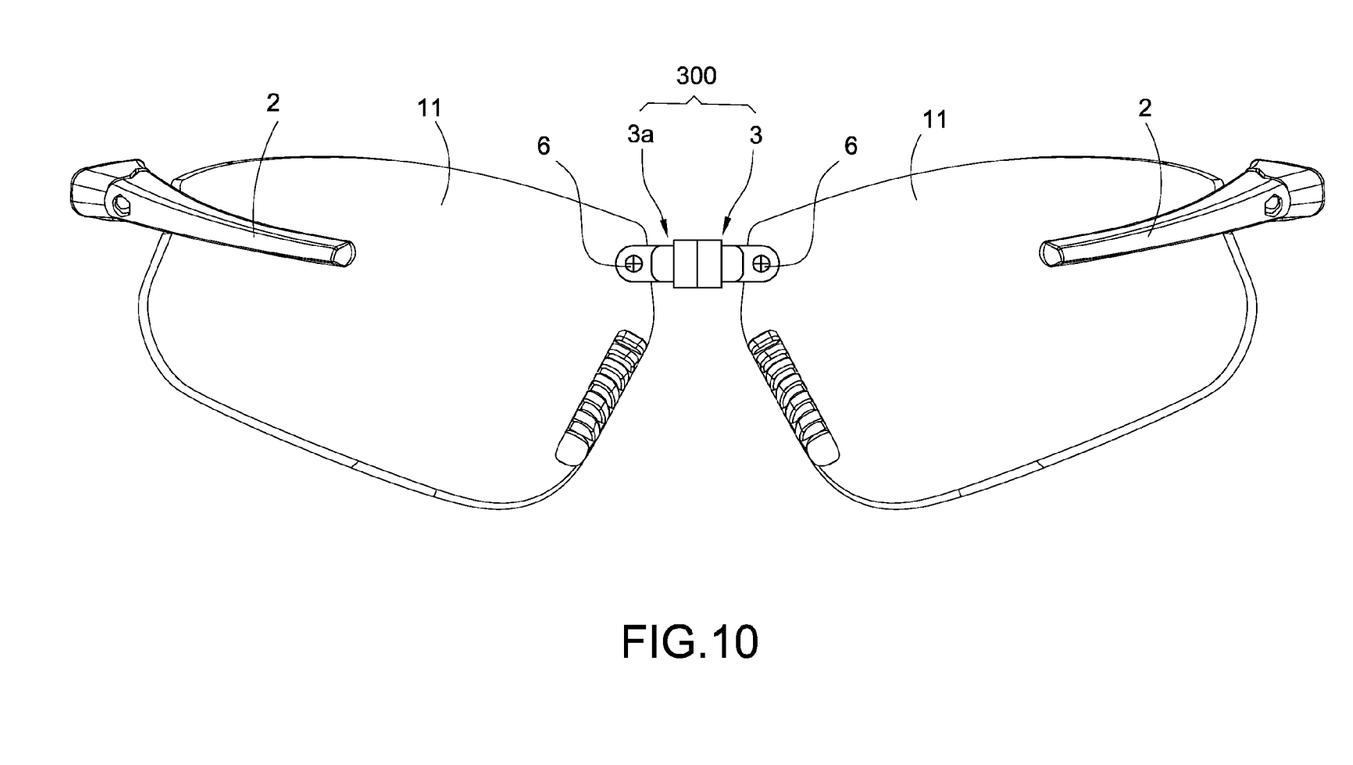
FIG. 10 is an illustration showing another embodiment of the pair of eyeglasses of the present invention.

The present invention provides a pair of eyeglasses and a foldable structure thereof, which can be a pair of eyeglasses including such as myopic glasses, presbyopia glasses and sunglasses to be worn on top of the nose. As shown in FIG. 1, the pair of eyeglasses comprises a pair of lens assemblies 1 aligned with each other in a row. In addition, the pair of eyeglasses further comprises a pair of temples 2. Accordingly, the lens assemblies 1 are constructed by lens frames 12 and lenses 11 (as shown in FIGS. 1~9), or constructed solely by lenses 11 (as shown in FIG. 10) and the present invention is not limited to any of such configurations. Accordingly, the two temples 2 are attached to the two distant sides opposing to each other of the two lens assemblies 1 respectively, and the foldable structure 300 of the pair of eyeglasses of the present invention is secured between two adjacent sides opposing to each other of the two lens assemblies 1. The foldable structure 300 comprises: a first body member 3, a second body member 3a, a bendable linear member 4 and an elastic unit 5.

Figure 2:
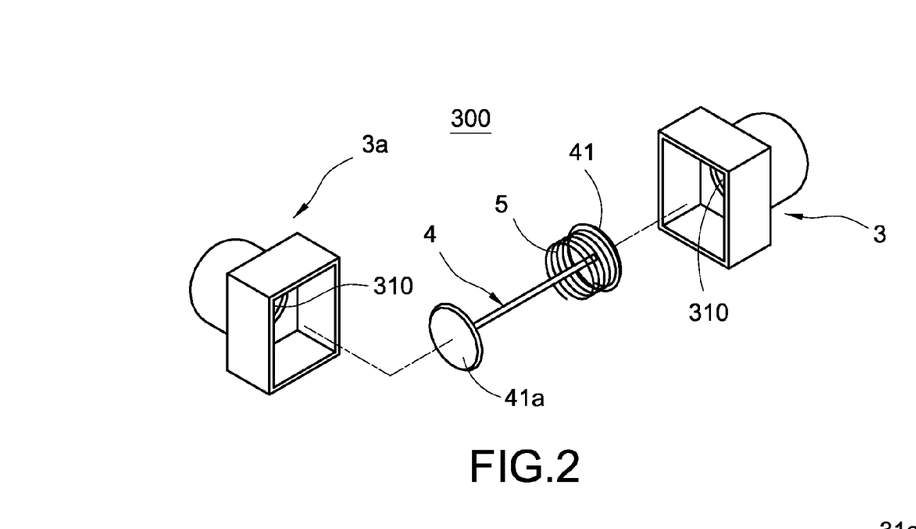
FIG. 2 is an exploded view of the first embodiment of the foldable structure of the pair of eyeglasses of the present invention.
Figure 3:
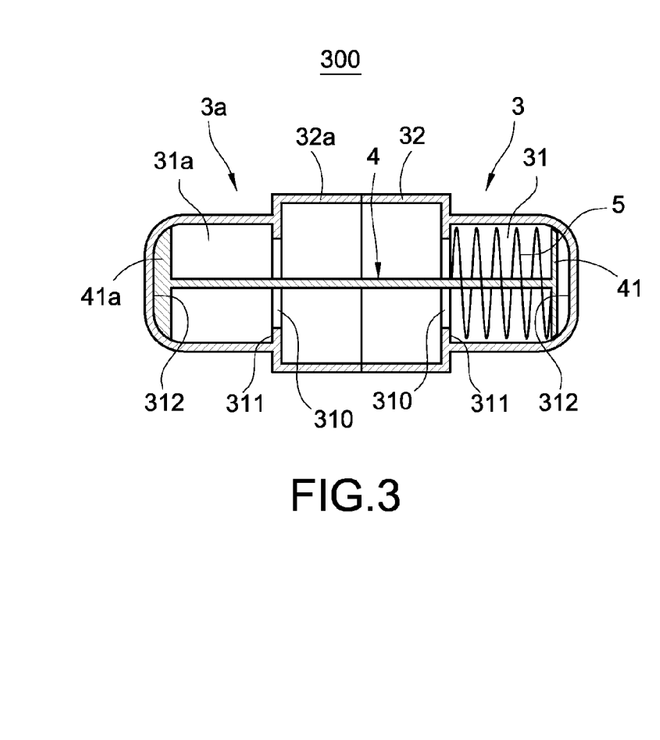
FIG. 3 is a cross sectional view of the assembly of the present invention shown in FIG. 2.
Figure 5:
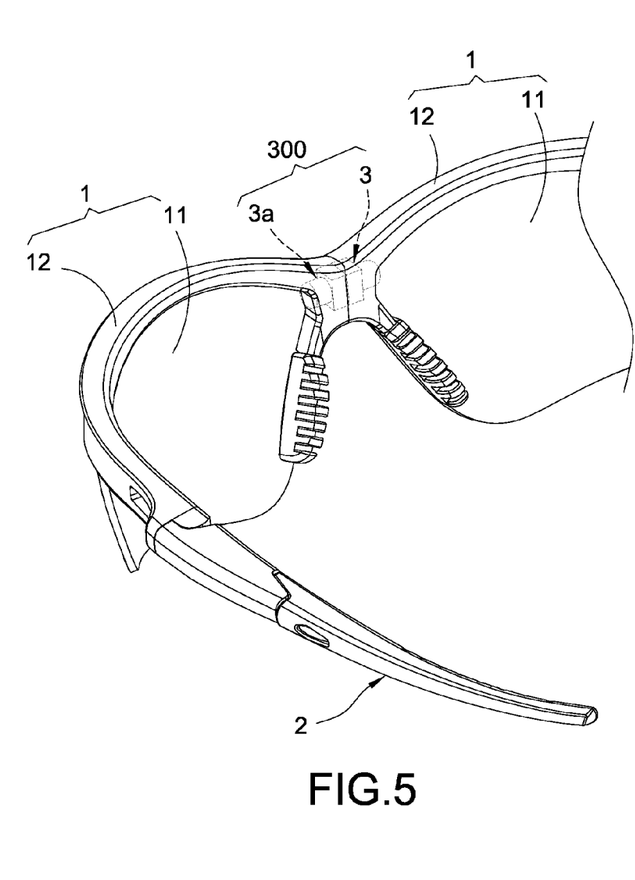
FIG. 5 is a perspective view of the assembly of the present invention shown in FIG. 1.

As shown in FIGS. 1-3 and 5, the first body member 3 comprises a receiving chamber 31, and an inner wall of the receiving chamber 31 comprises a first inner wall surface (as shown in FIG. 3) and a second inner wall surface 312 opposing to each other, and the first inner wall surface 311 of the receiving chamber 31 comprises a through hole 310 thereon. The second body member 3a is aligned with the first body member 3 in a row, and the first body member 3 and the second body member 3a are configured to rotate relatively to each other. Furthermore, the second body member 3a can be different from the first body member 3 (not shown in the figures). The adjacent sides of the receiving chamber 31 of the first body member 3 and another receiving chamber 31a of the second body member 3a comprise an extension portion 32 and another extension portion 32a in rectangular forms respectively, and the another extension portion 32a of the second body member 3a abuts the extension portion 32 of the first body member 3. In addition, as shown in FIGS. 1 and 5, the adjacent sides of the two lens frames 12 comprise a receiving hole 121 formed thereon respectively, and the first body member 3 and the second body member 3a are secured onto the two receiving holes 121 of the two lens frames 12 respectively.

The bendable linear member 4 can be any linear member that is bendable, such as a metal wire. The bendable linear member 4 penetrates through the aforementioned two through holes 310 to be connected between the receiving chamber 31 and the another receiving chamber 31a. The bendable linear member 4 comprises a stopping portion 41 on one end thereof, and the stopping portion 41 is received within the receiving chamber 31. Another end of the bendable linear member 4 can of various embodiments of attachment configurations; for example, the another end of the bendable linear member 4 can penetrate through the second body member 3a (not shown in the figure) and attach thereto directly or can be one of the following attachment configuration of the first and second embodiments described below. In the first and second embodiments, the second body member 3a is identical to the first body member 3; accordingly, the second body member 3a comprises the another receiving chamber 31a.

As shown in FIGS. 2 and 3, the first embodiment in which the another end of the bendable linear member 4 is being used for attachment is illustrated. The another end of the bendable linear member 4 can be secured onto the inner wall of the another receiving chamber 31a (not shown in the figures) directly. In this embodiment, the another end of the bendable linear member 4 comprises another stopping portion 41a, and the another stopping portion 41a is secured onto the second inner wall surface 312 of the another receiving chamber 31a.

Figure 6:
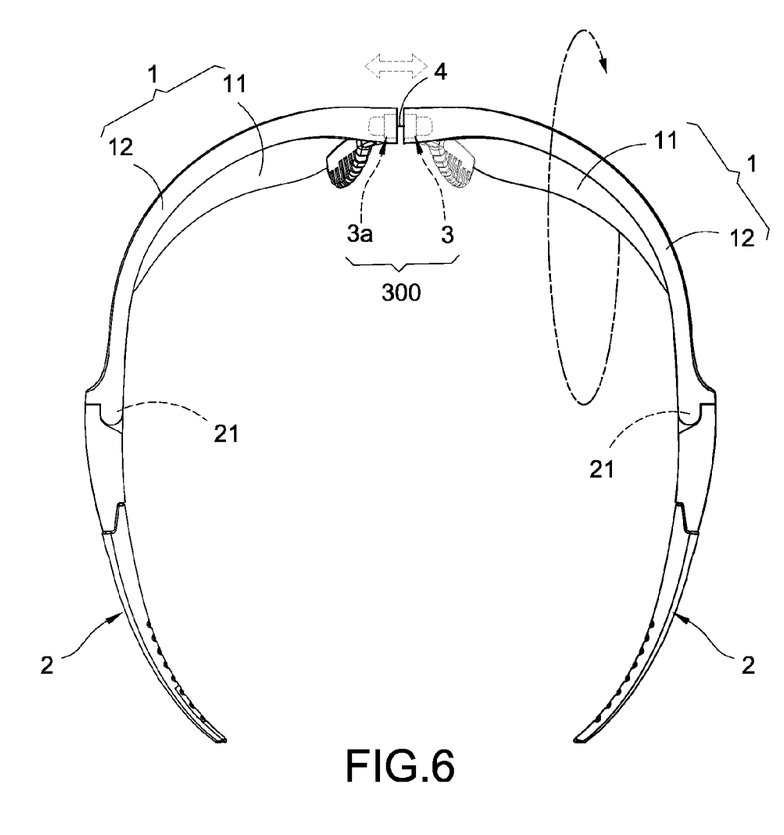
FIG. 6 is a first illustration showing a folding operation of the pair of eyeglasses of the present invention.
Figure 7:
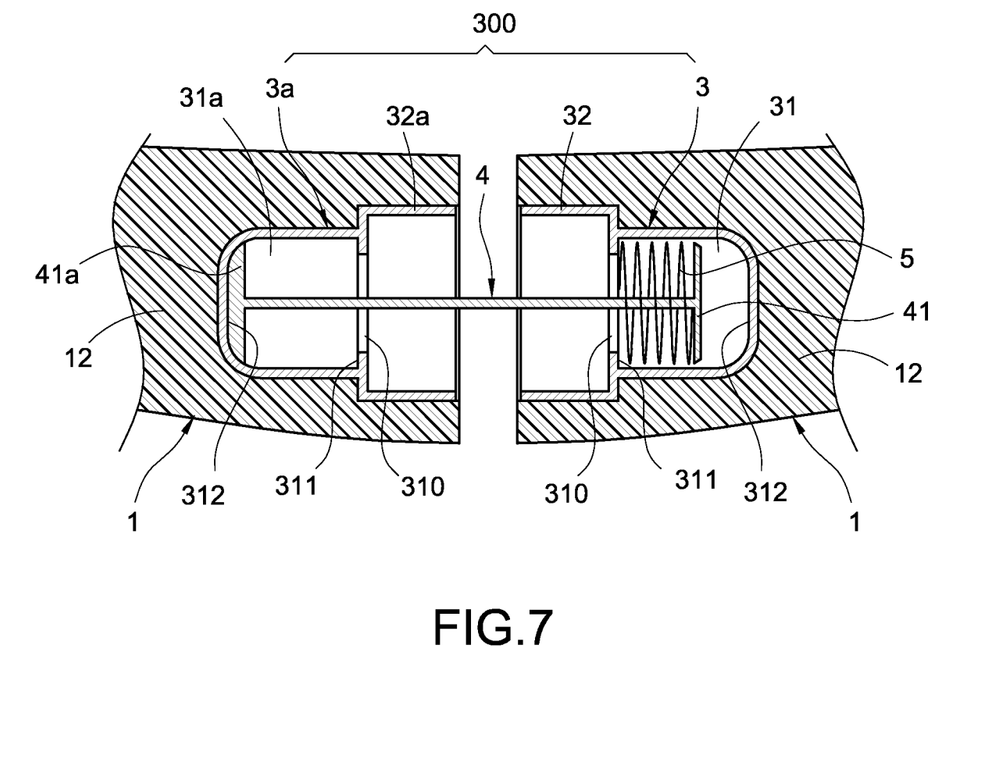
FIG. 7 is a partial cross sectional view of the present invention shown in FIG. 6.
Figure 8:
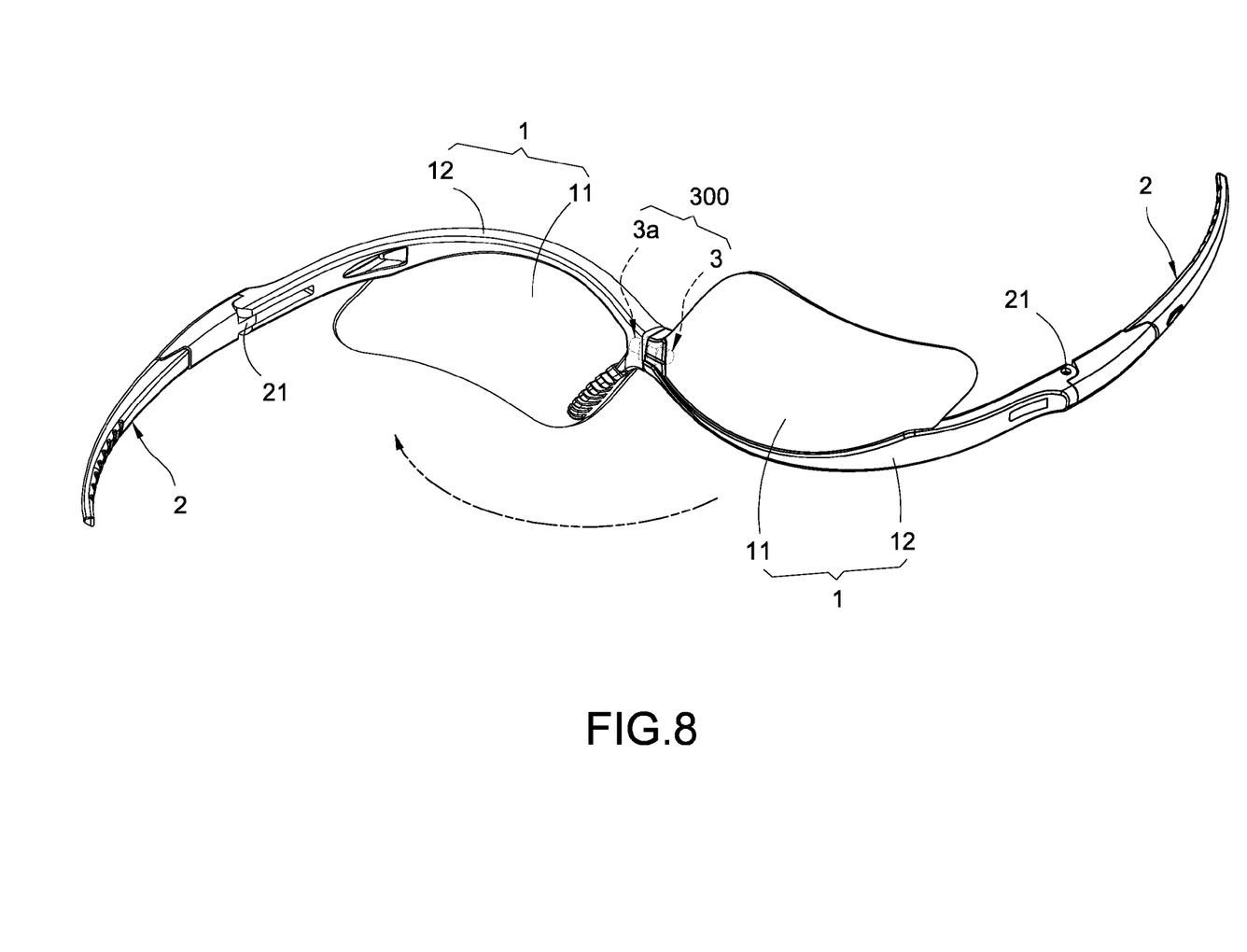
FIG. 8 is a second illustration showing another folding operation of the pair of eyeglasses of the present invention.
Figure 9:
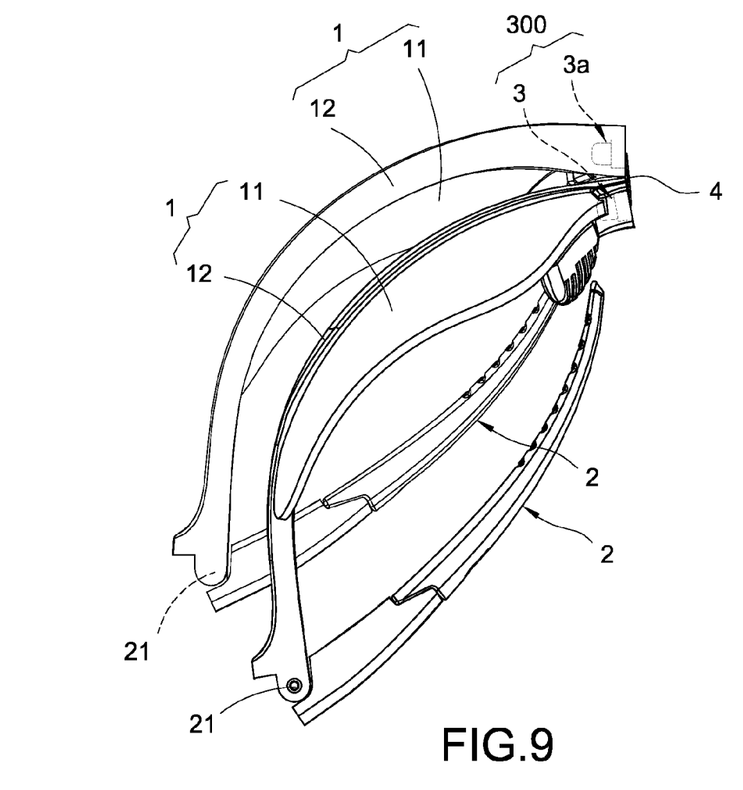
FIG. 9 is a third illustration showing still another folding operation of the pair of eyeglasses of the present invention.

The elastic unit 5 is mounted onto the bendable linear member 4, and the elastic unit 5 is clamped axially and elastically between the first inner wall surface 311 of the receiving chamber 31 and the stopping portion 41 such that during the pulling of the bendable linear member 4, the distance between the first inner wall surface 311 and the stopping portion 41 is reduced to elastically compress the elastic unit 5 (as shown in FIG. 7). Therefore, the first body member 4 and the second body member 3a can be pulled apart from each other and opposing thereto first (as shown in FIG. 6), followed by rotating the first body member 3 (as shown in FIG. 8) and alternatively, the second body member 3a can be chosen for rotation instead (not shown in the figure). Finally, the first and second body members can be folded up (as shown in FIG. 9) such that the pair of eyeglasses is advantageously folded.

Figure 4:
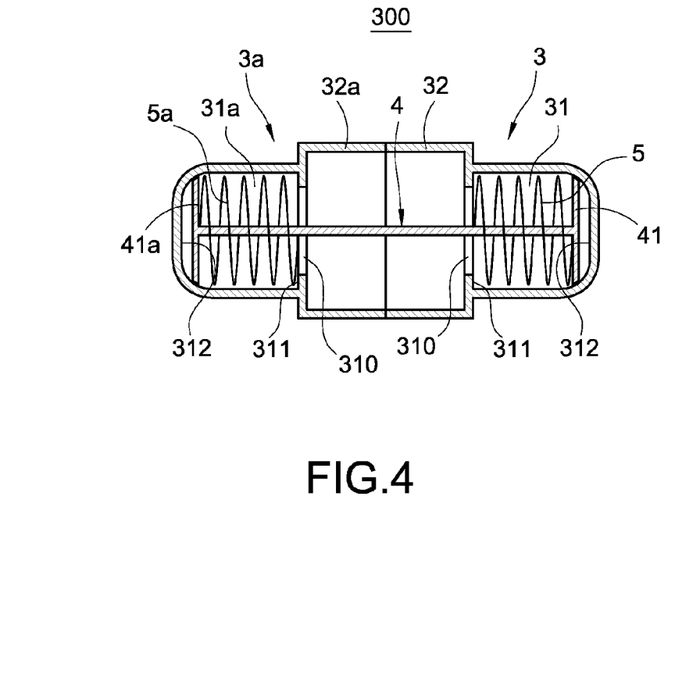
FIG. 4 is a cross sectional view of the second embodiment of the foldable structure of the pair of eyeglasses of the present invention.

As shown in FIG. 4, the second embodiment in which the another end of the bendable linear member 4 is being used for attachment is illustrated. The foldable structure 300 further comprises another elastic unit 5a, and the another end of the bendable linear member 4 further comprises another stopping portion 41a. The another stopping portion 41a is received within the another receiving chamber 31a. The another elastic unit 5a is mounted onto the bendable linear member 4 and is clamped axially and elastically between the first inner wall surface 311 of the another receiving chamber 31a and the another stopping portion 41a.

As shown in FIGS. 6 and 7, according to the illustrative first embodiment and during the folding of the pair of eyeglasses, the two lens assemblies 1 of the pair of the eyeglasses are pulled apart from each other and opposing thereto first such that the elastic unit 5 is compressed elastically due to the fixed length of the bendable linear member 4 in order pull apart the two lens assemblies 1 from each other with a certain distance (equivalent to the compressed distance of the elastic unit 5, as shown in FIG. 7). As shown in FIG. 8, then the first body member 3 is rotated relative to the second body member 3a such that the right lens assembly 1 is able to rotate 180 degree relative to the left lens assembly 1 and during which, the outer sides of the two lenses 11 are opposing to each other. As shown in FIG. 9, finally, the first body member 3 is folded relatively to the second body member 3a such that the right lens assembly 1 is able to fold relatively to the left lens assembly 1 in order to allow the outer side of the right lens 11 to stack onto the inner side of the left lens 11, which means that the same curvature and angles thereof are being stacked together to prevent the creation of any excess space of know arts and to significantly reduce the overall size of the pair of eyeglasses after folding for storage while the effect of advantageous folding of the eyeglasses can be achieved.

As shown in FIG. 10, the foldable structure 300 of the pair of eyeglasses of the present invention is not limited to the arrangement of being attached between the two lens frames 12. As shown in the figure, it can also be attached between two lenses 11 as long as at least one securement unit 6 is provided between the first body member 3 (the second body member 3a) and the lens 11 for securement, which allows the foldable structure 300 to be applied to a pair of frameless eyeglasses for it to be advantageously folded.

Figure 11:
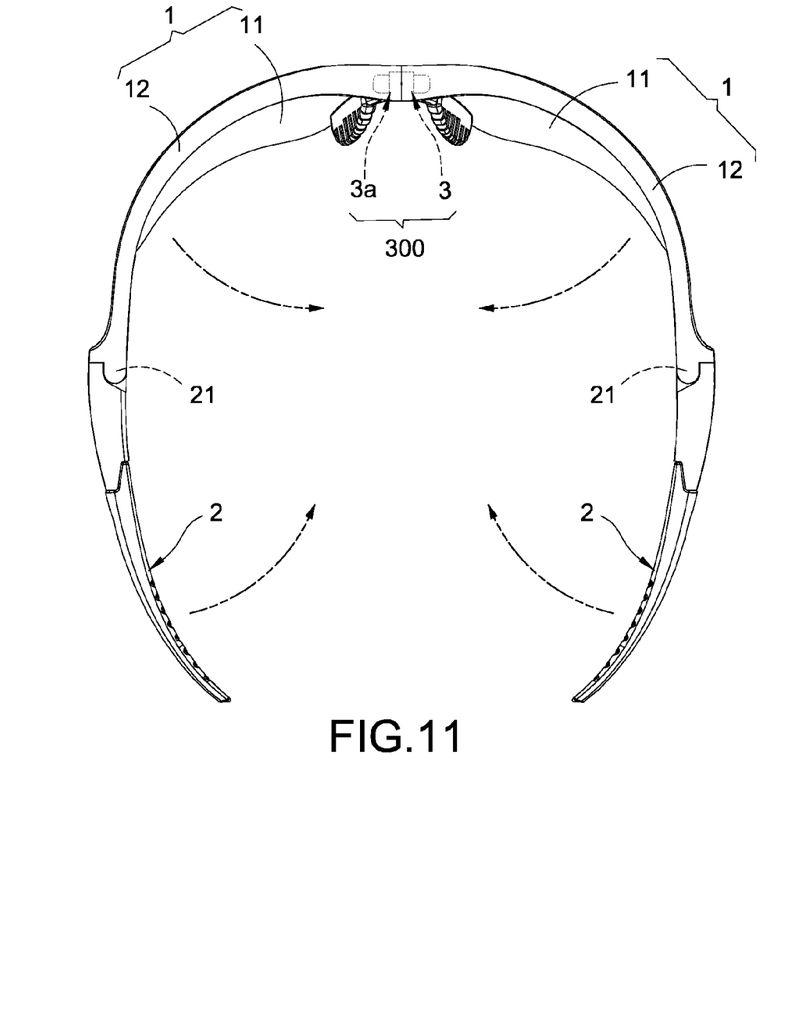
FIG. 11 is a first illustration showing another way of folding the pair of eyeglasses of the present invention.
Figure 12:
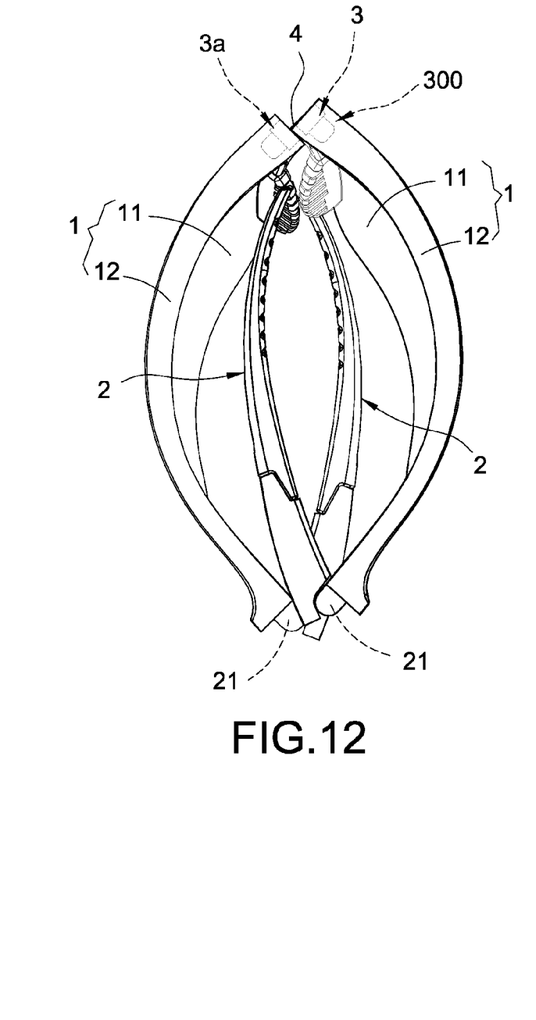
FIG. 12 is a second illustration showing still another way of folding the pair of eyeglasses of the present invention

As shown in FIGS. 11 and 12, in addition to the advantageous folding, the pair of eyeglasses of the present invention can be further folded up conventionally. During the operation, the two lens assemblies 1 need to be pulled apart from each other first, followed by folding up thereof as well as the folding of the temples 2.

During the folding of the eyeglasses of the present invention, the attachment portions 21 of the temples 2 are pivotally attached to the lens frames 12 such that they can be rotated axially with the attachment portions 21 in order to fold the temples 2.

In view of the above and in comparison to the known arts, the present invention is of the following technical effects and merits of: capable of being advantageously folded up to significantly reduce the overall size after folding and being configured for facilitated portability and storage.

The above description provides the preferred embodiments of the present invention including the best mode thereof for illustrative purposes only and shall not be treated as limitations of the present invention. Any modifications to the structure of the present invention based on the above description and accompanied drawings shall be considered to be within the scope of the present invention.

What is claimed is:

1. A foldable structure of a pair of eyeglasses, comprising:
   a first body member comprising a receiving chamber;
   a second body member aligned with said first body in a row and configured to rotate relatively thereto;
   a bendable linear member comprising a stopping portion on one end thereof; said stopping portion received within said receiving chamber; another end of said bendable linear member penetrated said second body member and attached thereto; and an elastic unit mounted on said bendable linear member and clamped axially and elastically between an inner wall of said receiving chamber and said stopping portion.

2. The foldable structure of a pair of eyeglasses according to claim 1, wherein said second body member is identical to said first body member; said second body member comprises another receiving chamber; said another end of said bendable linear member is secured onto an inner wall of said another receiving chamber.

3. The foldable structure of a pair of eyeglasses according to claim 1, wherein said second body member is identical to said first body member; said second body member comprises another receiving chamber; said another end of said bendable linear member comprises another stopping portion, and said another stopping portion is secured onto an inner wall of said another receiving chamber.

4. The foldable structure of a pair of eyeglasses according to claim 3, wherein adjacent sides of said receiving chamber of said first body member and said another receiving chamber of said second body member further comprise an extension portion and another extension portion respectively; said another extension portion of said second body member abuts said extension portion of said first body member.

5. The foldable structure of a pair of eyeglasses according to claim 4, wherein adjacent sides of said receiving chamber of said first body member and said another receiving chamber of said second body member further comprise a through hole respectively; said bendable linear member penetrates through said two through holes to be connected between said receiving chamber and said another receiving chamber.

6. The foldable structure of a pair of eyeglasses according to claim 1, further comprising another elastic unit; wherein said second body member is identical to said first body member; said second body member comprises another receiving chamber; said another end of said bendable linear member comprises another stopping portion, and said another stopping portion is received within said another receiving chamber; said another elastic member is mounted onto said bendable linear member and is clamped axially and elastically between an inner wall of said another receiving chamber and said another stopping portion.

7. The foldable structure of a pair of eyeglasses according to claim 6, wherein adjacent sides of said receiving chamber of said first body member and said another receiving chamber of said second body member further comprise an extension portion and another extension portion respectively; said another extension portion of said second body member abuts said extension portion of said first body member.

8. The foldable structure of a pair of eyeglasses according to claim 7, wherein adjacent sides of said receiving chamber of said first body member and said another receiving chamber of said second body member further comprise a through hole respectively; said bendable linear member penetrates through said two through holes to be connected between said receiving chamber and said another receiving chamber.

9. The foldable structure of a pair of eyeglasses according to claim 1, wherein said bendable linear member is a bendable metal wire.

10. A pair of eyeglasses, comprising:
a pair of lens assemblies aligned with each other in a row; and
a foldable structure comprising:
a first body member comprising a receiving chamber;
a second body member aligned with said first body in a row and configured to rotate relatively thereto;
a bendable linear member comprising a stopping portion on one end thereof; said stopping portion received within said receiving chamber; another end of said bendable linear member penetrated said second body member and attached thereto; and
an elastic unit mounted on said bendable linear member and clamped axially and elastically between an inner wall of said receiving chamber and said stopping portion.

11. The pair of eyeglasses according to claim 10, wherein said second body member is identical to said first body member; said second body member comprises another receiving chamber; said another end of said bendable linear member is secured onto an inner wall of said another receiving chamber.

12. The eyeglasses according to claim 10, wherein said second body member is identical to said first body member; said second body member comprises another receiving chamber; said another end of said bendable linear member comprises another stopping portion, and said another stopping portion is secured onto an inner wall of said another receiving chamber.

13. The pair of eyeglasses according to claim 12, wherein adjacent sides of said receiving chamber of said first body member and said another receiving chamber of said second body member further comprise an extension portion and another extension portion respectively; said another extension portion of said second body member abuts said extension portion of said first body member.

14. The pair of eyeglasses according to claim 13, wherein adjacent sides of said receiving chamber of said first body member and said another receiving chamber of said second body member further comprise a through hole respectively; said bendable linear member penetrates through said two through holes to be connected between said receiving chamber and said another receiving chamber.

15. The pair of eyeglasses according to claim 10, further comprising another elastic unit; wherein said second body member is identical to said first body member; said second body member comprises another receiving chamber; said another end of said bendable linear member comprises another stopping portion, and said another stopping portion is received within said another receiving chamber; said another elastic member is mounted onto said bendable linear member and is clamped axially and elastically between an inner wall of said another receiving chamber and said another stopping portion.

16. The pair of eyeglasses according to claim 15, wherein adjacent sides of said receiving chamber of said first body member and said another receiving chamber of said second body member further comprise an extension portion and another extension portion respectively; said another extension portion of said second body member abuts said extension portion of said first body member.

17. The pair of eyeglasses according to claim 16, wherein adjacent sides of said receiving chamber of said first body member and said another receiving chamber of said second body member further comprise a through hole respectively; said bendable linear member penetrates through said two through holes to be connected between said receiving chamber and said another receiving chamber.

18. The pair of eyeglasses according to claim 10, wherein said bendable linear member is a bendable metal wire.

19. The pair of eyeglasses according to claim 10, wherein each one of said lens assemblies comprises a lens frame and a lens attached to said lens frame; said first body member and said second body member are secured onto two adjacent sides of said two lens frames respectively.

20. The pair of eyeglasses according to claim 10, wherein each one of said lens assemblies is a lens; said first body member and said second body member are secured onto two adjacent sides of said two lens frames respectively.

21. The pair of eyeglasses according to claim 10, further comprising a pair of temples; said pair of temples are attached to two distant sides of said pair of lens assemblies respectively.

22. The pair of eyeglasses according to claim 21, wherein each one of said lens assemblies comprises a lens frame and a lens attached to said lens frame; said pair of temples are attached to two distant sides of said two lens frames respectively; said first body member and said second body member are secured onto two adjacent sides of said two lens frames respectively.

23. The pair of eyeglasses according to claim 21, wherein each one of said lens assemblies is a lens; said pair of temples are attached to two distant sides of said two lenses respectively; said first body member and said second body member are secured onto two adjacent sides of said two lenses respectively.

* * * * *